Sept. 24, 1968 J. W. SCHROETER 3,402,879
FAN CONSTRUCTION
Filed April 3, 1967
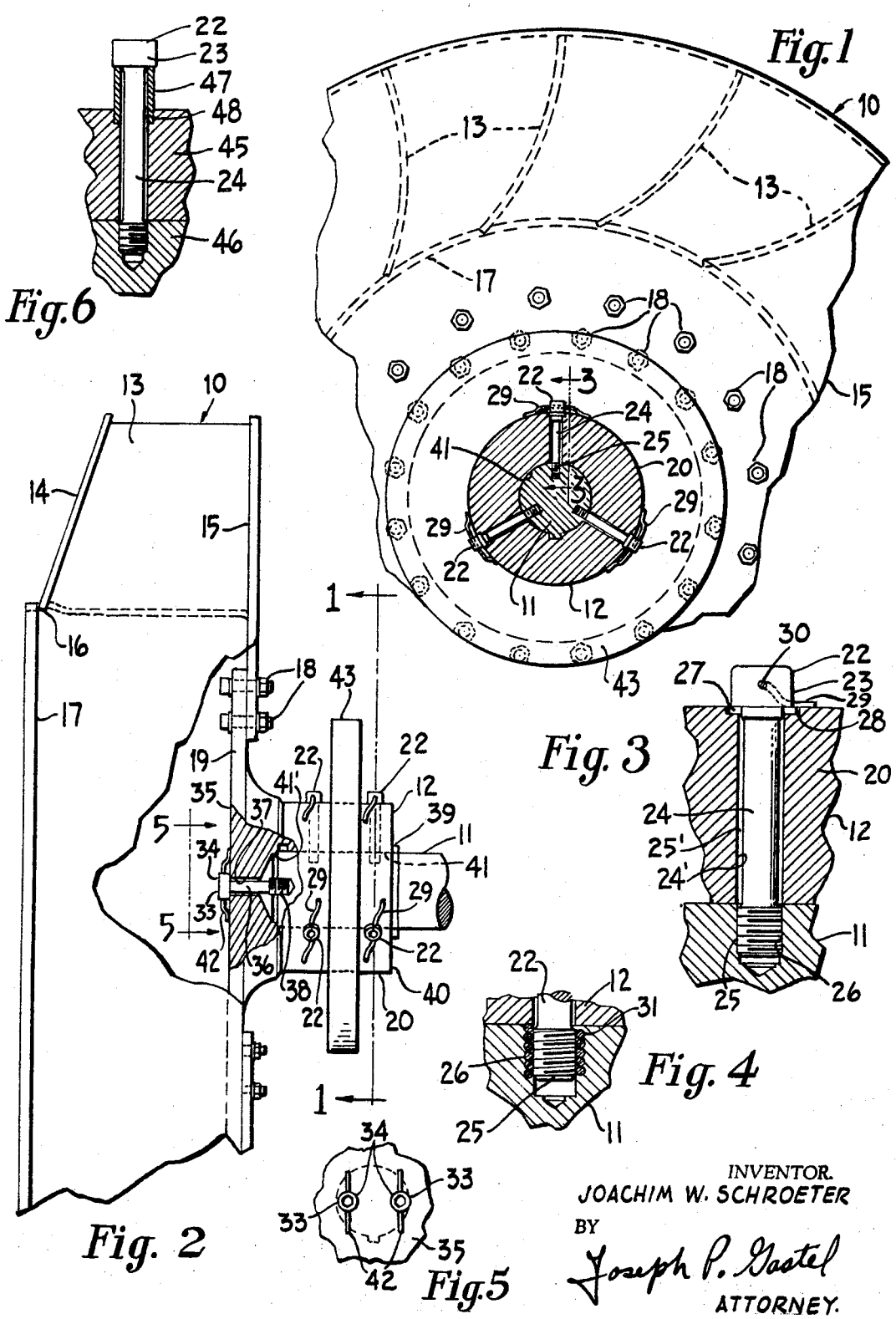
INVENTOR.
JOACHIM W. SCHROETER
BY
Joseph P. Gastel
ATTORNEY.

United States Patent Office 3,402,879
Patented Sept. 24, 1968

3,402,879
FAN CONSTRUCTION
Joachim W. Schroeter, Depew, N.Y., assignor to Buffalo Forge Company, Buffalo, N.Y., a corporation of New York
Filed Apr. 3, 1967, Ser. No. 627,792
21 Claims. (Cl. 230—134)

ABSTRACT OF THE DISCLOSURE

A hub to shaft mounting construction for a fan in which a plurality of equidistantly circumferentially spaced radial screws extend through the hub and thread into the shaft, with each of the screws having equal torque applied thereto so as to place the central portions of the screws between the heads and the threaded portions thereof in tension to thereby maintain the hub centered on the shaft, the radial screws including means for locking them in their tensioned positions. In addition, a plurality of axially extending screws fasten the hub to the shaft to eliminate the shear loading on the radial screws.

Background of the invention

The present invention relates to an improved fan construction and more particularly to an improved hub to shaft attaching arrangement therefor for maintaining the hub centered on the shaft under all conditions of operation.

By way of background, there are in common use extremely large fans which are subjected to rapid changes in temperatures. These fans typically may have an outer diameter of six feet and include an annular hub which may be one foot in diameter and have a wall thickness of about three inches. This hub is mounted on a shaft which is approximately six inches in diameter. When fans of this size are subjected to rapid changes in temperature, the hub will expand rapidly without a simultaneous corresponding increase in the expansion of the shaft, which in turn will cause the hub to become loosened. This looseness will destroy the balance and in turn set up an objectionable vibration. In the past, the hub was shrunk on to the shaft, that is, it was heated before mounting and allowed to shrink in position. However, when the hub was heated in operation, it became loose because of the above described action. It is with a construction which obviates the foregoing shortcomings that the present invention is concerned.

Summary of the invention

It is accordingly one object of the present invention to provide an improved construction for mounting a hub on the shaft in such a manner that it remains centered thereon regardless of expansion of the hub relative to the shaft, even though the hub may expand sufficiently to cause a clearance to exist between it and the shaft. Other objects and attendant advantages of the present invention will readily be perceived hereafter.

The improved hub to shaft mounting construction of the present invention includes a hub having a plurality of circumferential symmetrically spaced radial screws extending therethrough and being received in threaded relationship in the shaft. Equal torque is applied to each of the screws to thereby place the central portions thereof, between their heads and their portions which thread into the shaft, in equal tension. As the hub expands or contracts, the tension on each of the screws will also change, but the tension provided by each screw at any particular time will be equal to the tension of each of the other screws at that time. This will maintain the hub centered on the shaft, notwithstanding that the hub may even expand sufficiently so as to create a clearance between it and the shaft. Thus, the hub will remain concentric with the shaft under all conditions of operation. In addition, the present invention includes means for maintaining the screws locked under equal torque in the positions to which they have been preset so as to avoid unequal forces on the hub as a result of uneven loosening. To eliminate shear loading on the radial screws, axial screws extend through the hub and thread into the shaft in an axial direction. The present invention will be more fully understood when the following portions of the specification are read in conjunction with the accompanying drawings wherein:

Brief description of the drawing

FIGURE 1 is a fragmentary front elevational view of a fan which includes the improved hub to shaft mounting construction of the present invention, FIGURE 1 being partially in cross section because it was taken along line 1—1 of FIGURE 2;

FIGURE 2 is a fragmentary side elevational view of the fan shown in FIGURE 1;

FIGURE 3 is an enlarged view of a screw in position, this view being partially in cross section and taken generally in the direction of line 3—3 of FIGURE 1;

FIGURE 4 is a fragmentary cross sectional view showing a modified manner of threading the screw into the shaft;

FIGURE 5 is a view taken substantially along line 5—5 of FIGURE 2; and

FIGURE 6 is a modified form of the present invention.

Description of the preferred embodiments

The improved fan construction 10 includes a shaft 11 mounting hub 12 which in turn carries the remainder of the fan structure. More specifically, the fan includes a plurality of blades 13 having their opposite side edges fastened, as by welding, between annular flange 14 and annular back plate 15. The inner edge 16 of flange 14 is attached, as by welding, to circular inlet ring 17 which defines the space through which air is drawn. Back plate 15, in turn, is attached by nut and bolt assemblies 18 to outer annular portion 19 of hub 12, portion 19 being formed integrally with cylindrical portion 20.

As noted above, the fan is subjected to rapid changes in temperature in operation. When the fan goes from a cold condition to a hot condition, the heat which is picked up by blades 13 will be transmitted by conduction to the central portion 20 of hub 12. It will be appreciated that central portion 20 will therefore expand without a corresponding simultaneous expansion of shaft 11, and this expansion may be sufficient to cause the hub 12 to become loose. In fact, because of the size of the hub, there may be sufficient expansion to create a clearance and this in turn would cause an unbalance which in turn has in the past set up vibrations in the fan, the vibrations being relatively great because of the speed and relatively large dimensions of the fan.

The instant mode of attachment between the hub 12 and shaft 11 obviates the unbalance which was heretofore caused by the rapid expansion of the hub 12 relative to shaft 11. As can be seen from FIGURES 1, 2 and 3, a plurality of screws 22 are circumferentially equidistantly spaced on hub 12. Each screw 22 includes a head 23 which bears on hub portion 20, a central body portion 24 which is located in bore 24', and a threaded end 25 which is received in tapped bore 26 in shaft 11. As will become more apparent hereafter, the threaded of end 25 into bore 26 while head 23 is retarded against axial movement because of its bearing relationship on hub portion 20 will cause central portion 24 to be placed in tension.

As can be seen from FIGURE 2, the central body portion 24 is machined to a predetermined diameter which is smaller than the diameter of either the threaded end 25 or head 23. This causes the tensile load to be more concentrated in central body portion 24 so that it is this portion which will stretch when portion 20 expands. Each of body portions 24 is of an equal length and cross sectional dimension to provide a symmetrical loading under all stressed conditions. It is to be noted that the length of central body portion 24 is sufficiently great to permit it to stretch sufficiently to accommodate expansion of the hub without exceeding the design stresses. The diameter of portion 24 is less than the root diameter of threaded portion 25 so that the stretching will occur in portion 24. As can be seen from FIGURES 1 and 2, there are two rows of screws 22 which are axially spaced from each. The axial spacing enhances stability by maintaining shaft 11 and the bore of hub 12 parallel, even if the hub should expand away from the shaft. In the drawings two rows are shown, with each row including three screws circumferentially spaced 120° from each other. It will be appreciated that any number of screws may be used in each row, provided that they are equidistantly spaced from each other, or provide symmetrical forces attaching the hub to the shaft. For example, four screws would be spaced 90° apart, five screws would be placed 72° apart and six screws would be spaced 60° apart. Each row can contain a different number of screws.

As can be seen from FIGURE 3, a washer 27 is interposed between head 23 and counterbore 28 in hub 12. Each screw 22 is tightened so that it has the same amount of torque exerted thereon. The torque applied to each screw 22 is such that the central body portion 24 thereof is placed under a predetermined tension so that when the central portion 20 of hub 12 expands due to heating, the maximum expansion will cause the tensile force to which the central portion 24 is subjected to be no greater than the design limit for the material used, this design limit being below the elastic limit of the material which the screws are made of. Each screw 22 is tightened the same amount and therefore the forces urging the central portion of the hub 20 toward the shaft 11 at equidistantly circumferentially spaced locations will be equal. Therefore, in the event there is an expansion of the central portion 20 of hub 12, it will be resisted by equal forces produced by screws 22. This resistance, being provided by equally spaced equal forces will cause hub 12 to remain centered on shaft 11, even if the hub expands a sufficient amount so as to create a clearance between it and shaft 11. There will always be a sufficient tensile force provided by screws 22 to maintain good firm mounting of hub 12 on shaft 11 regardless of the relative temperatures between shaft 11 and hub 12. It is to be noted that a clearance 25' exists between central body portion 24 and bore 24' of hub portion 20 to obviate any possibility of transverse loading and friction between hub 12 and screw portion 24, which could cause the hub to lose its concentric relationship relative to shaft 11.

To insure that screws 22 do not become loosened, they are locked in place. To this end, a wire 29 is threaded through a bore 30 in each head 23 and the ends of wires 29 are welded to the outer surface of hub 12. In lieu of this, the heads 22 may be welded to hub 12. Any other suitable locking arrangement may also be used.

A heat slinger 43, in the shape of an annular disc is mounted on portion 20 of hub 12 to aid in dissipating heat. Slinger 43 may also be in the shape of a fan having radial blades, if desired. It will be appreciated that the heat slinger may be omitted, if desired.

In order to obviate shear loading on screws 22, a plurality of axially extending screws 33 are provided, each of which has a head portion 34 which bears on plate 35 of hub 12. The central portion 36 of each screw extends through a bore 37 in hub 12 and is received in a mating tapped aperture 38 in shaft 11. A shoulder in the form of a collar 39 is provided on shaft 11 and abuts end 40 of hub 12. Thus, hub 12 is located on shaft 11 by being moved axially by the tightening of screws 33 until end 40 abuts collar 39. As can be seen from FIGURE 2, the head 34 of screws 33 bears against portion 35 of hub 12 to draw the hub into position on the shaft 11. In lieu of collar 39, the end of shaft 11 may abut shoulder 41' to locate the hub on the shaft. Wires 42 extend through heads 34 and the opposite ends of these wires are welded to plate surface 35 to lock screws 33 in position. It will be appreciated that the locking force provided by screws 33 eliminates the axial loading and shear on radial screws 22.

In FIGURE 4 an alternate type of connection is shown for attaching the threaded portion 25 of screw 22 in tapped hole 26. This connection includes a screw thread insert or thread liner 31 which is essentially a helical coil of material which lines the tapped hole 26. This item is commercially available under the trademark Helicoil, as shown in Bulletin 800, dated 1962, of the Helicoil Company of Danbury, Conn. This screw thread insert increases the thread strength and tends to eliminate thread failure by giving better load distribution on the threads. It can be seen that this is especially desirable in the present combination in view of the large forces to which the threads are subjected.

In FIGURE 6 an alternate embodiment of the present invention is shown wherein a hub 45 is mounted on a shaft 46 by means of a plurality of equidistantly spaced screws 22 which may be identical in all respects to screws 22 shown in the preceding figures. Therefore, a detailed description of these screws 22 will not be repeated in the interest of brevity. However, as can be seen from FIGURE 6, a sleeve 47 is interposed between head 23 of the screw and counterbore 48 in hub 45. This is necessary because if head 23 were placed in counterbore 48 the length of central body portion 24 might not be long enough to provide enough stretching, in response to expansion to hub 45, without exceeding the design limit of the material of the screw. In other words, the length of body portion 24 must be longer than the thickness of hub 45 and therefore collar 47 must be provided between hub 45 and screw head 23.

It is also to be noted at the present time that the foregoing description has generally referred to the screws as being circumferentially equidistantly spaced. This is the preferred arrangement. However, it will be appreciated that the screws may be symmetrically placed and the same effect will be obtained. Either of these arrangements is considered to be "balanced," that is it will provide spaced forces which center the hub on the shaft.

Summarizing, it can readily be seen that the hub is attached to the shaft by a plurality of radial screws which are placed in tension and thus provide equal forces at spaced locations, either equidistantly spaced or symmetrically spaced, to thereby urge the hub toward the shaft in a balanced manner. The central portions of each of the screws are of equal cross sectional dimension and equal length so that they will stretch uniformly in response to the expansion of the hub to thereby maintain the hub centered on the shaft even though the hub may expand sufficiently to provide a clearance between it and the shaft. Furthermore, the central portions of the screws are long enough so that they do not stretch beyond the design limit of the material, that is, they will not stretch beyond the point where they can return to their original length when the hub contracts to its original size. In addition, the screws are locked against turning to prevent an uneven exertion of forces by the screws as a result of uneven loosening. Furthermore, axial screws are provided for locking the hub to the shaft in an axial direction to obviate axial loading on the radial screws.

It can thus be seen that the improved construction of the present invention is manifestly capable of achieving the above enumerated objects and while preferred embodiments of the present invention have been disclosed, it is to be understood that it is not limited thereto but may be otherwise embodied within the scope of the following claims.

1. A fan construction comprising: a hub; blade means, means mounting said blade means on said hub; a bore in said hub; a shaft in said bore; a plurality of first radial bores in said shaft; a tapped portion in each of said first radial bores; a plurality of second radial bores in said hub in alignment with said first radial bores; and a plurality of radial screws extending through aligned pairs of said first and second bores, each of said radial screws including a threaded end portion for mating engagement with said tapped portion of each of said first bores, a head for effectively bearing on said hub, and a central portion between said head and said threaded portion and located in each of said second bores; each of said screws being tightened to a predetermined equal torque which places each of said central portions in equal tension and said screws being spaced circumferentially from each other to provide balanced forces between said hub and shaft, whereby relative expansion between said hub and said shaft effectively results in the placing of equal incremental tension on each of said screws to cause said screws to maintain said balanced forces between said hub and shaft and thereby maintain said hub centered on said shaft.

2. A fan construction as set forth in claim 1 wherein said central portion of each of said screws is of lesser diameter than the threaded end and head thereof, and wherein said central portion of each of said screws is of equal cross sectional area and length to produce uniform elongation under stress.

3. A fan construction as set forth in claim 2 wherein said second bores are of a sufficiently greater size than said central portions of said screws to provide a clearance therebetween to obviate transverse loading on said screws.

4. A fan construction as set forth in claim 2 including means for locking each of said radial screws against rotation to maintain each of said screws firm against loosening.

5. A fan construction as set forth in claim 2 wherein said plurality of radial screws are positioned in axially spaced rows with the screws of each row being circumferentially spaced from each other to provide balanced forces.

6. A fan construction as set forth in claim 5 wherein said second bores are of a sufficiently greater size than said central portions of said screws to provide a clearance therebetween to obviate transverse loading on said screws.

7. A fan construction as set forth in claim 6 wherein said means for locking each of said screws comprise a bore in each of said heads, wire means extending through each of said bores, and means fastening said wire means to prevent rotation of said screws.

8. A fan construction as set forth in claim 7 wherein said means fastening said wire means comprises welded connections between said wire means and said hub.

9. A fan construction as set forth in claim 2 including means in addition to said radial screws for holding said hub against axial movement on said shaft to thereby tend to obviate shear loading on said radial screws.

10. A fan construction as set forth in claim 9 wherein said means for holding said hub against axial movement comprises axial screw means extending through said hub and being received in said shaft.

11. A fan construction as set forth in claim 10 wherein said shaft is received in a blind bore in said hub, and wherein said means for holding said hub against axial movement includes shoulder means for limiting the extent of movement of said shaft into said blind bore.

12. A fan construction as set forth in claim 11 wherein said shoulder means comprises a shoulder on said shaft externally of said hub for effecting an abutting relationship with said hub whereby said hub is essentially located between said axial screws and said shoulder means.

13. A fan construction as set forth in claim 11 including means for locking said radial screws against movement to thereby cause said radial screws to maintain an equal tension relative to each other.

14. A fan construction as set forth in claim 10 including means for locking each of said radial screws against rotation to maintain each of said screws firm against loosening.

15. A fan construction as set forth in claim 14 including means for locking each of said axial screw means against rotation to maintain said axial screw means firm against loosening.

16. A construction for mounting a hub on a shaft and maintaining said hub centered thereon irrespective of relative expansion between said hub and said shaft comprising: a hub; an axial bore in said hub; a shaft in said bore; a plurality of first radial bores in said shaft; a tapped portion in each of said first radial bores; a plurality of second radial bores in said hub in alignment with said first radial bores; and a plurality of radial screws each extending through an aligned pair of said first and second bores: each of said radial screws including a threaded end portion for mating engagement with said tapped portion of each of said first bores, a head for effectively bearing on said hub, and a central portion between said head and said threaded portion and located in each of said second bores; each of said screws being tightened to a predetermined equal torque which places each of said central portions in equal tension and said screws being spaced circumferentially from each other to provide balanced forces between said hub and said shaft, whereby relative expansion between said hub and said shaft effectively results in the placing of equal incremental tension on each of said screws to cause said screws to maintain said balanced forces between said hub and shaft and thereby maintain said hub centered on said shaft.

17. A construction as set forth in claim 16 wherein said second bores are of a sufficiently greater size than said central portions of said screws to provide a clearance therebetween and thereby obviate transverse loading on said screws.

18. A construction as set forth in claim 17 wherein said central portion of each of said screws is of lesser diameter than the threaded end and head thereof, and wherein said central portion of each of said screws is of equal cross sectional area and length to produce uniform elongation under stress.

19. A construction as set forth in claim 18 including means for holding said hub against axial movement relative to said shaft to thereby tend to obviate shear loading on said radial screws.

20. A construction as set forth in claim 19 including means for locking said radial screws against loosening to thereby cause each of said screws to maintain an equal tensile force in the central portion thereof.

21. A construction as set forth in claim 20 including means for locking said means for holding said hub against axial movement against loosening.

References Cited

UNITED STATES PATENTS

| | | | |
|---|---|---|---|
| 930,169 | 8/1909 | Exley | 287—52.09 |
| 1,900,128 | 3/1933 | Persons | 103—111 |

FOREIGN PATENTS

| | | |
|---|---|---|
| 1,036,273 | 8/1958 | Germany. |
| 5,955 | 5/1894 | Sweden. |

HENRY F. RADUAZO, *Primary Examiner.*